Patented Apr. 28, 1936

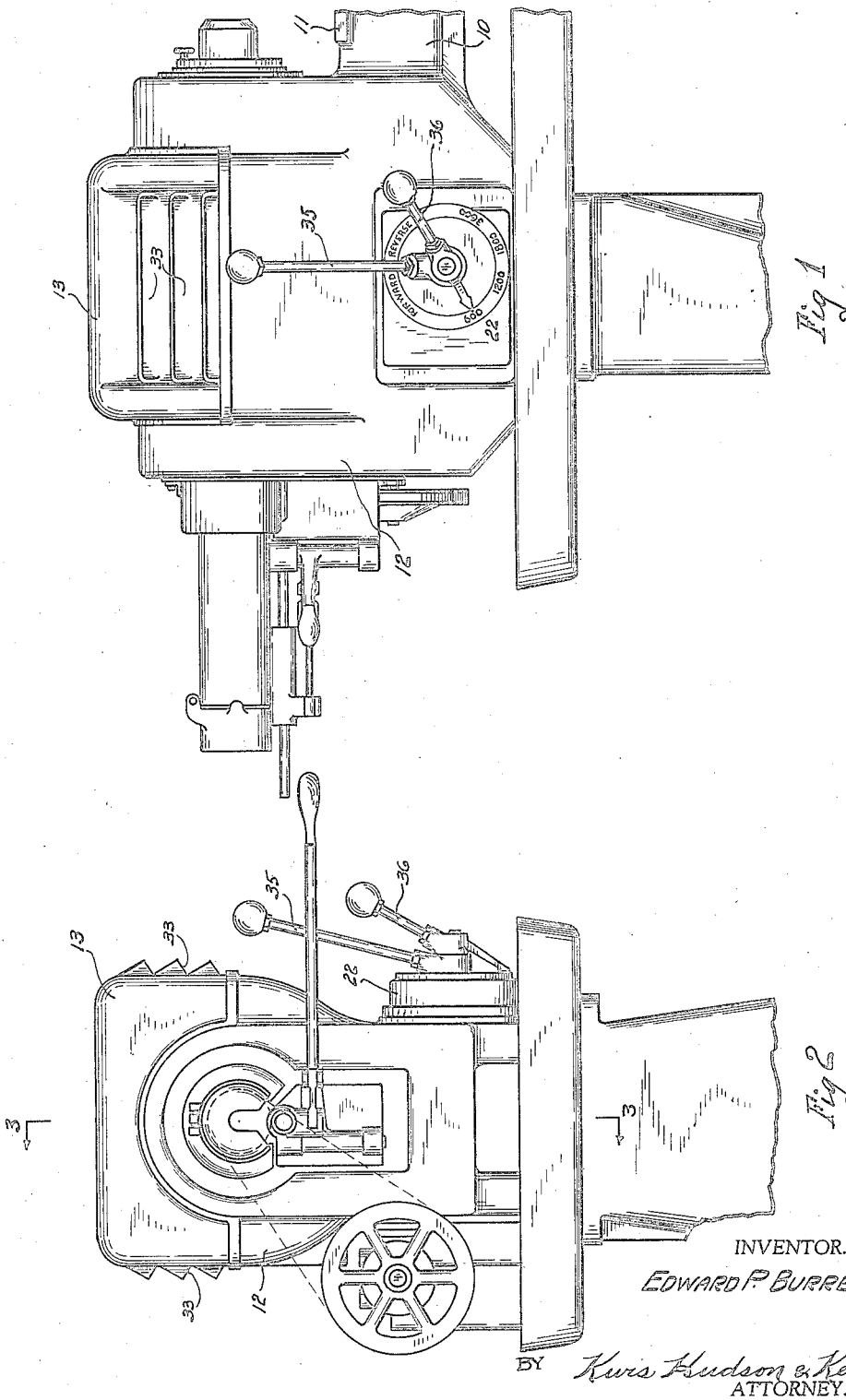

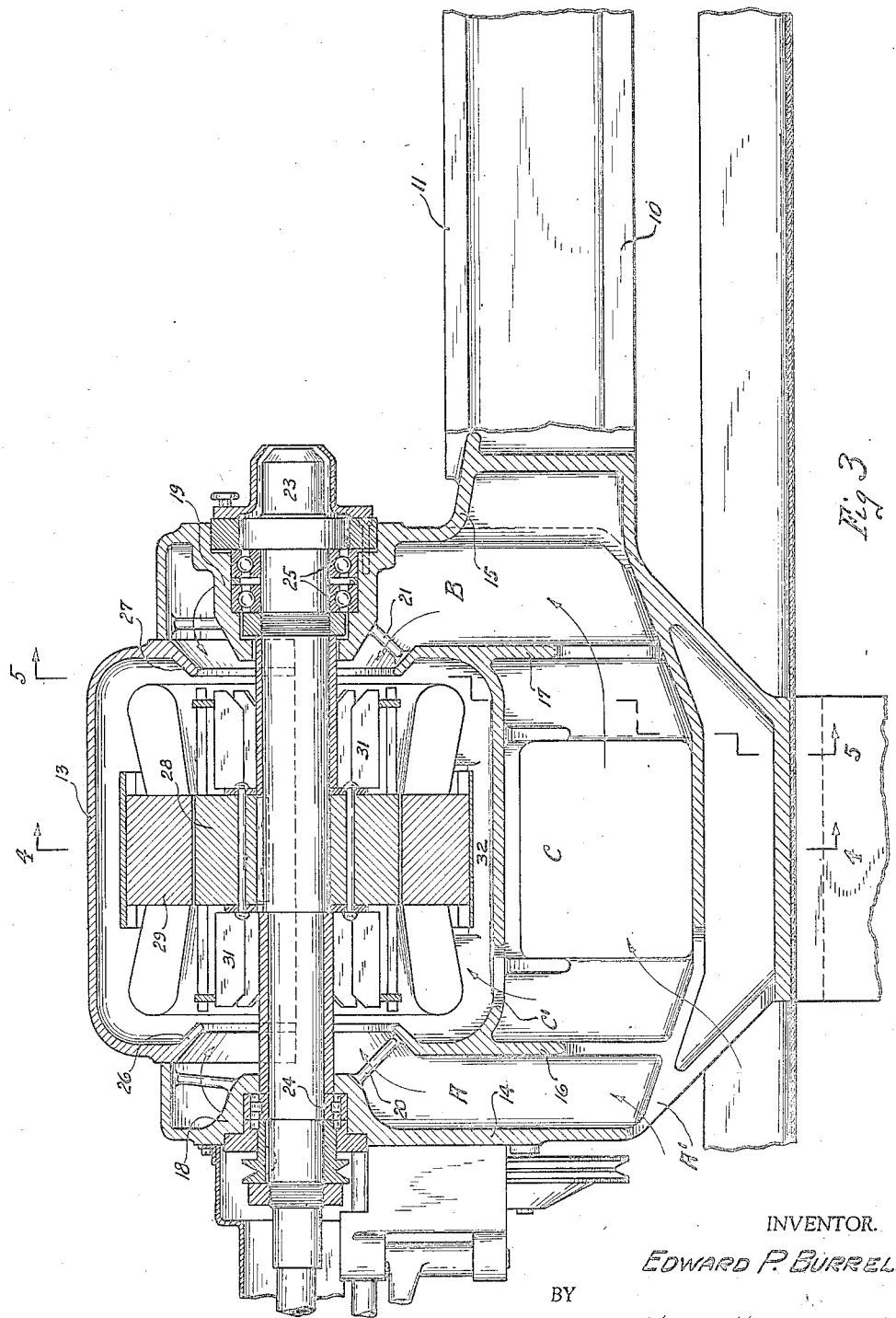

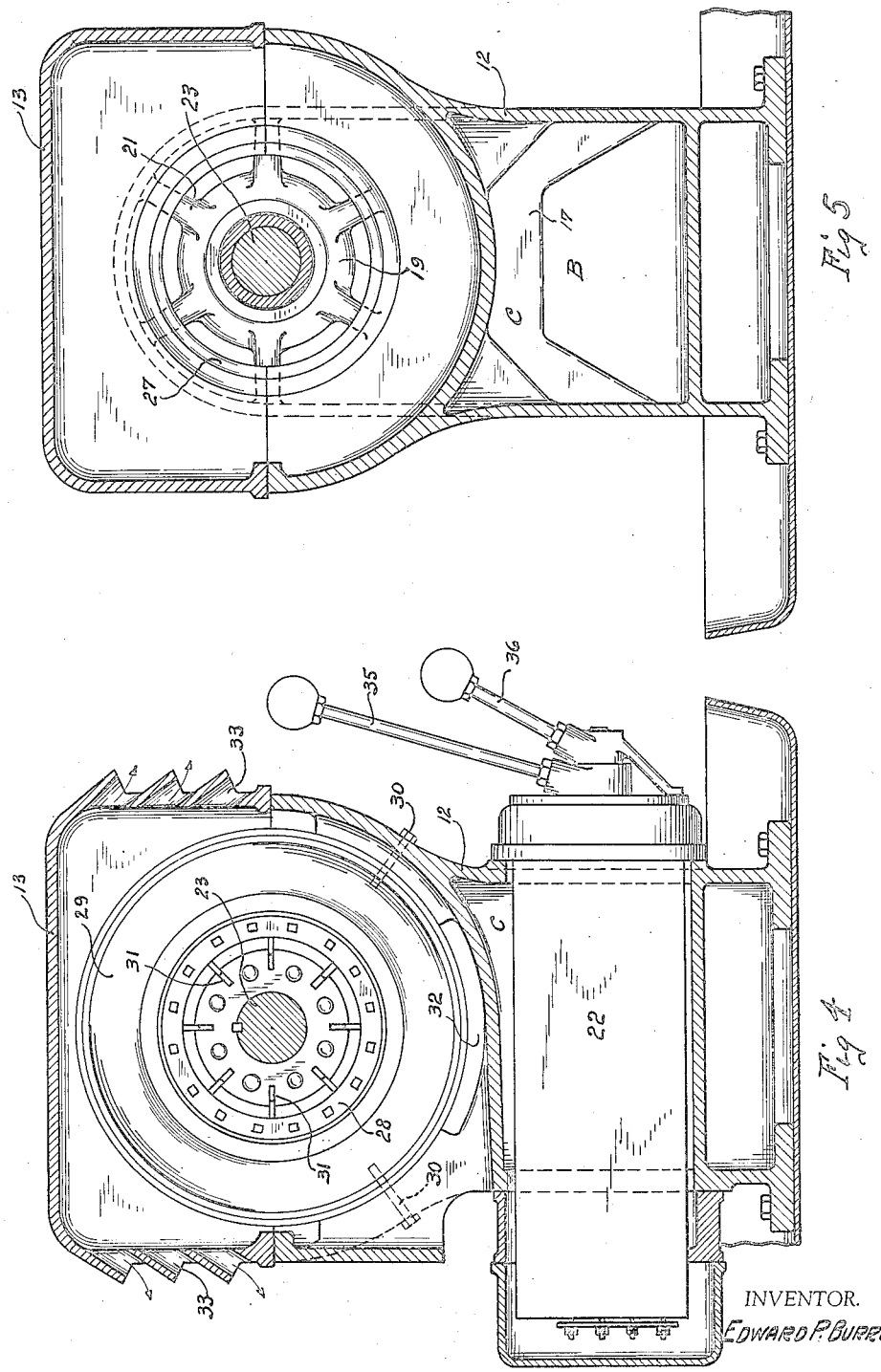

2,039,146

UNITED STATES PATENT OFFICE 2,039,146

MACHINE TOOL

Edward P. Burrell, Shaker Heights, Ohio, assignor to The Warner & Swasey Company, Cleveland, Ohio, a corporation of Ohio Original application May 12, 1932, Serial No. 610,904. Divided and this application June 21, 1935, Serial No. 27,739

4 Claims. (Cl. 82—32)

This invention relates to a machine tool and particularly to a system for controlling the temperature of those parts of a machine tool which are subject to temperature changes during the operation of the machine.

The present application is a division of my copending application Serial Number 610,904, filed May 12, 1932.

Heretofore the quality of the cutting tools used in machine tools has precluded the use of high operating speeds for the machine since the tools would break down during the cutting engagement with the work. The slow operating speeds under the old practice did not produce in the various operative parts of the machine sufficient heat to be detrimental to the machine or to said parts. On the other hand the high quality of the cutting tools now used in machine tools permits the machines to be operated at high operating speeds, wherefore the various moving parts and the bearings therefor of the machine are subjected to detrimentally high temperatures.

An object of the invention is to provide in a machine tool efficient and effective means for controlling the temperature of certain moving parts of the machine and the supports therefor that are subject to temperature changes during the operation of the machine.

Another object is to provide means in a machine tool for maintaining the correct relationship between various moving parts of the machine and their supports that are subject to temperature changes during operation, to the end that the efficiency and accuracy of the machine will be retained.

Another object is to provide in a machine tool passageways in the machine through which fluid is circulated and which passageways substantially surround certain moving parts of the machine and their supports, whereby the circulating fluid will control the temperature of said parts and supports.

Another object of the invention is to provide in a machine tool, having certain moving parts which together with their supports are subject to temperature changes during operation, means for circulating fluid in thermal transferring relationship to said parts and supports in such volume, velocity and temperature as to maintain said parts and supports substantially at a desired temperature.

A further object is to provide in a machine tool wherein the work spindle constitutes the rotor spindle of the operating motor, passageways surrounding the bearings at said spindle and through which fluid can be circulated for controlling the temperature of the bearings.

A still further object is to provide in a machine tool means for preventing distortion of the bearings of moving parts of the machine due to temperature changes and which consists in circulating fluid in the passageways surrounding the bearings, thus preventing misalignment between the bearings for said parts.

A further object is to provide in a machine tool wherein the work spindle constitutes the rotor spindle of the main operating motor, passageways surrounding the bearings for said spindle and communicating with a chamber housing the motor control unit, wherefore fluid is circulated through said chamber, then through said passageways and around the bearings to control the temperature of the bearings and the motor control unit.

Further and additional objects and advantages appear hereinafter during the following detailed description of an embodiment of the invention which is illustrated in the accompanying drawings, wherein Fig. 1 is a fragmentary front elevational view of a machine tool embodying the present invention.

Fig. 2 is an end elevational view of the machine shown in Fig. 1 and is taken from the left hand end thereof.

Fig. 3 is a vertical sectional view on an enlarged scale taken substantially on line 3—3 of Fig. 2 looking in the direction of the arrows with the motor control unit removed.

Fig. 4 is a vertical transverse sectional view taken substantially on line 4—4 of Fig. 3 looking in the direction of the arrows, the motor and the motor control unit being shown in elevation.

Fig. 5 is an irregular vertical transverse sectional view taken substantially on line 5—5 of Fig. 3 looking in the direction of the arrows.

Although the invention contemplates the provision of means in a machine tool for controlling the temperatures of various moving parts of the machine and their supports which are subject to temperature changes in operation, the embodiment of the invention illustrated in the accompanying drawings and described herein will relate, by way of illustration, to the provision of means in the head of the machine for controlling the temperature of the bearings for the work spindle, which in this case is also the rotor spindle for the operating motor, as well as for controlling the temperature of the motor control unit located in the bed beneath the head, but it should be understood that the invention is applicable for controlling the temperature of other moving parts of the machine together with the supports therefor.

The employment of high grade cutting tools as practiced at the present time in machine tools has necessitated and permitted high work spindle speeds, which results in greatly increasing the degree of heat developed by the various operative parts of the machine and their supports. In addition the use of higher grade cutting tools permits deeper and heavier cuts to be taken in the work, resulting in greater thrust between the tools and work, with a consequent increase in the heat developed in the bearings for the spindle during the operation of the machine. The continuous operation of machine tools under the above mentioned conditions and for long periods of time brings about distortion in the different parts of the machine because of the amount of heat developed in the bearings therefor, and unless this heat is kept substantially at room temperature or at some other desired determinable temperature the accuracy and efficiency of the machine will be destroyed due to the changed relationship between the parts.

The present invention contemplates the provision of means in a machine tool which will maintain the various moving parts of the machine and their supports or bearings, as well as the elements controlling the same, at the proper temperature thereby eliminating distortion, retaining the accuracy and efficiency of the machine and reducing to a minimum the wear occasioned in such parts during their operation.

The present invention is embodied in a machine tool wherein the work spindle constitutes the rotor spindle of an electric motor housed in the head of the machine and forming the driving motor for the spindle. The machine tool illustrated comprises a bed 10 having ways 11 and a head 12 provided with a cover 13. The head 12 is formed with ends walls 14 and 15 and with intermediate walls 16 and 17, said walls forming passageways A and B surrounding the bearing supports 18 and 19 formed in inwardly extending portions integral with the walls 14 and 15 and connected to the intermediate walls 16 and 17 by circumferentially spaced ribs 20 and 21. The passageways A and B extend downwardly below the head and into the bed and are in communication by means of openings in the walls 16 and 17 with a chamber C which houses the controller unit 22 for the motor, see Figs. 3 and 4. The passageway A at its lower end is in communication with the atmosphere through an opening A' formed in the wall 14. Likewise it will be noted that the chamber C is in communication with the atmosphere through the opening A' and an opening formed in the bottom wall of the chamber and forming a continuation of the opening in the wall 16. The upper wall of the compartment C is provided with a small opening C' directly communicating with the motor chamber wherein is located the stator for the motor. The work spindle which, it will be remembered is also the rotor spindle for the motor, is indicated at 23 and is rotatably mounted in bearings 24 and 25 located, respectively, in the bearing supports 18 and 19 and in the present instance being in the form of anti-friction bearings.

The intermediate walls 16 and 17 and the walls of the head cover 13 adjacent the bearing supports 18 and 19 and inwardly thereof are provided with funnel-shaped portions 26 and 27 for the purpose of directing the fluid passing through the passageways A and B and around the bearing supports inwardly of the head. The spindle 23 intermediate the funnel-shaped portions 26 and 27 is provided with a rotor 28 arranged to rotate within the stator 29 of the motor, said stator being secured to the front and rear walls of the motor chamber or head by means of suitable securing bolts as indicated at 30 in Fig. 4. The work spindle or rotor spindle 23 is provided intermediate the rotor 28 and the funnel-shaped portions 26 and 27 with fan blades 31, so positioned and shaped as to throw fluid radially outwardly when the rotor is rotating. An opening is provided between the securing points 30 for the stator which forms a passageway 32 connecting the spaces surrounding the opposite ends of the stator. The head cover 13 which is arranged over the stator is provided in its front and rear walls with louvre openings 33, see Fig. 4. It will be seen that when the work spindle is rotating during the operation of the motor the fan blades 31 act to force the fluid or air radially outwardly with respect to the spindle and through the louvre openings 33, see arrows in Fig. 4. This forcing of the fluid or air outwardly of the motor chamber in the head through the louvre openings produces a suction which results in air, at room temperature, being drawn through the opening A' into the passage A and into the control unit chamber C from which latter chamber after passing around and across the motor control unit 22 it passes through the opening in the wall 17 into the passageway B and through the opening C' into the motor chamber, as indicated by the arrows in Fig. 3. The air drawn into the passageway A circulates completely around and against the bearing support 18, after which it passes between the ribs 20, through the funnel-shaped portion 26 into the motor chamber and the interior of the stator. Similarly the air drawn into the passageway B circulates completely around and against the bearing support 19 before it passes between the ribs 21 through the funnel-shaped portion 27 and into the motor chamber and the interior of the stator.

It will be remembered that a portion of the air drawn into chamber C passes through the opening C' and into the motor chamber and through the passageway 32 to the opposite sides of the motor stator. The air at room temperature passing through the passageways A and B and circulating completely around and against the bearing supports 18 and 19 and before reaching the motor chamber acts to maintain the temperature of the work spindle bearings 24 and 25 substantially at room temperature despite high operating speeds and increased end thrust of the work spindle, thus preventing distortion of said bearings and supports and thereby maintaining an accurate alignment of the bearings, supports and work spindle with relation to each other and to the other parts of the machine.

It will also be noted that the air at room temperature is drawn into the chamber C and circulates over and around the motor control unit 22 before said air passes into the motor chamber or into the passageway B, and thus heating of the control unit is prevented. In addition it will be noted that after the air at room temperature has circulated about and cooled the bearings and their supports and the motor control unit and is then drawn into the motor chamber, it will have the additional and incidental function of circulating through the motor chamber and cooling the motor.

It will be understood, of course, that various spindle speeds may be imparted to the work spindle 23 by means of the motor control unit 22 which controls the speed of operation of the motor, which unit is operated by the stop, forward and reverse lever 35 and the speed control lever 36 located at the front of the machine.

In consideration of the fact that in a machine embodying the present invention the bearings for the work spindle can be maintained substantially at room temperature or at any other desired and determinable temperature even though the work spindle is rotating at high operating speeds and is subjected to great end thrusts due to the tools taking heavier cuts, it should be noted that the machine illustrated herein can be successfully operated at a work spindle speed of 3600 R. P. M. as indicated in Fig. 1 without in any way lowering the efficiency, destroying the accuracy of the machine or injuring, misaligning or distorting the bearings for the work spindle.

Although a single embodiment of the present invention has been illustrated and described herein it should be understood that the invention is susceptible of various modifications and adaptations within the scope of the appended claims.

Having thus described my invention I claim:

1. In a machine tool having a head provided with spaced bearings and a bed provided with a way, the axes of said bearings and said way being arranged in exact parallel relationship, said head having wall portions defining passageways substantially surrounding said bearings, a work or tool spindle mounted in said bearings, fan blades carried by said spindle and creating a circulation of air through said passageways and around said bearings during the rotation of the work or tool spindle to control the temperature of said bearings and to prevent distortion therein and a variation in the relationship of the way and bearings, and means for rotating said work or tool spindle.

2. In a machine tool having a head provided with spaced bearings and a bed provided with a way, a work or tool spindle mounted in said bearings, said head having wall portions defining passageways substantially surrounding said bearings, fan members carried by said work or tool spindle for circulating air through said passageways and around said bearings during the rotation of the work or tool spindle, and a motor mounted on said work or tool spindle.

3. In a machine tool having a head provided with bearings and a bed provided with a way, said head including end walls and walls arranged intermediate said end walls, certain of said intermediate walls forming with said end walls passageways which substantially surround said bearings, said last named intermediate walls having funnel-shaped openings extending inwardly of the head and placing said passageways in communication with the interior thereof, a work or tool spindle mounted in said bearings and extending through said funnel-shaped openings, fan members carried by said tool or work spindle and arranged in the interior of the head for drawing air through said passageways and around said bearings and into the interior of the head, and means for rotating said work or tool spindle.

4. In a machine tool having a head and a bed provided with a way, said head including end walls and walls located intermediate said end walls and forming a plurality of chambers one of which houses a motor control unit, certain of said second named walls forming with said end walls passageways communicating with said chambers, bearings located in said passageways, a work or tool spindle mounted in said bearings, fan members carried by said work or tool spindle in another of said chambers, and a motor for rotating said work or tool spindle whereby fluid will be circulated through said passageways completely around and against said bearings and through said chambers and over said control unit.

EDWARD P. BURRELL.